United States Patent
Bartram

(10) Patent No.: US 7,558,409 B2
(45) Date of Patent: Jul. 7, 2009

(54) SYSTEM AND METHOD FOR IDENTIFYING A USER BY GRADING A DIGITAL REPRESENTATION OF AN ANALOGUE FORM ENTERED BY THE USER

(75) Inventor: Anthony Vaughan Bartram, Bradville Milton Keynes (GB)

(73) Assignee: KeCrypt Systems Limited, Kent (GB)

( * ) Notice: Subject to any disclaimer, the term of this patent is extended or adjusted under 35 U.S.C. 154(b) by 496 days.

(21) Appl. No.: 10/491,248

(22) PCT Filed: Sep. 27, 2002

(86) PCT No.: PCT/EP02/10847

§ 371 (c)(1),
(2), (4) Date: Jan. 26, 2005

(87) PCT Pub. No.: WO03/030090

PCT Pub. Date: Apr. 10, 2003

(65) Prior Publication Data

US 2005/0141753 A1     Jun. 30, 2005

(30) Foreign Application Priority Data

Oct. 1, 2001   (GB)   ................ 0123547.2

(51) Int. Cl.
*G06K 9/00* (2006.01)
(52) U.S. Cl. ............ 382/119; 73/865.4; 178/18.01; 348/161
(58) Field of Classification Search .......... 382/119
See application file for complete search history.

(56) References Cited

U.S. PATENT DOCUMENTS

| 4,040,010 | A |   | 8/1977  | Crane et al. |
|-----------|---|---|---------|--------------|
| 5,101,437 | A | * | 3/1992  | Plamondon ................. 382/122 |
| 5,226,091 | A | * | 7/1993  | Howell et al. ............... 382/107 |
| 5,657,396 | A |   | 8/1997  | Rudolph et al. |
| 6,148,093 | A |   | 11/2000 | McConnell et al. |

FOREIGN PATENT DOCUMENTS

| EP | 0 851 693 A1  | 12/1997 |
|----|---------------|---------|
| GB | 2 229 305 A   | 9/1990  |
| GB | 2 237 917 A   | 5/1991  |
| JP | 04352080 A    | 12/1992 |
| JP | 09288729 A    | 11/1997 |
| WO | WO 00/79806 A1| 12/2000 |

* cited by examiner

*Primary Examiner*—Vikkram Bali
*Assistant Examiner*—Edward Park
(74) *Attorney, Agent, or Firm*—Kirschstein, et al.

(57) ABSTRACT

A system for identifying a user by deriving a digital representation of an analogue form entered by the user, the analogue form being distinctive of the user; and by grading the digital representation against a plurality of grades. The grades are defined dependent upon possible variation in the analogue form. The grades ensure the same grading of the analogue form notwithstanding the variation. The graded digital representation constitutes an identification of the user.

16 Claims, 8 Drawing Sheets

Calibrator

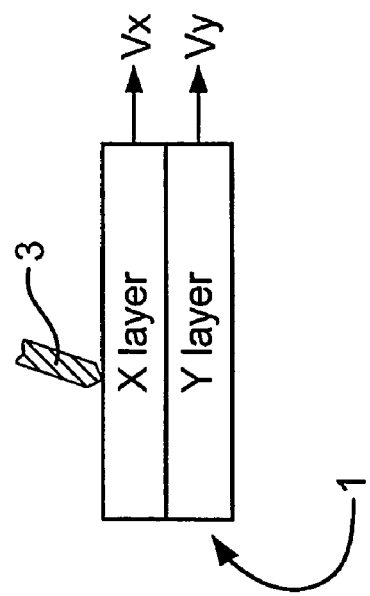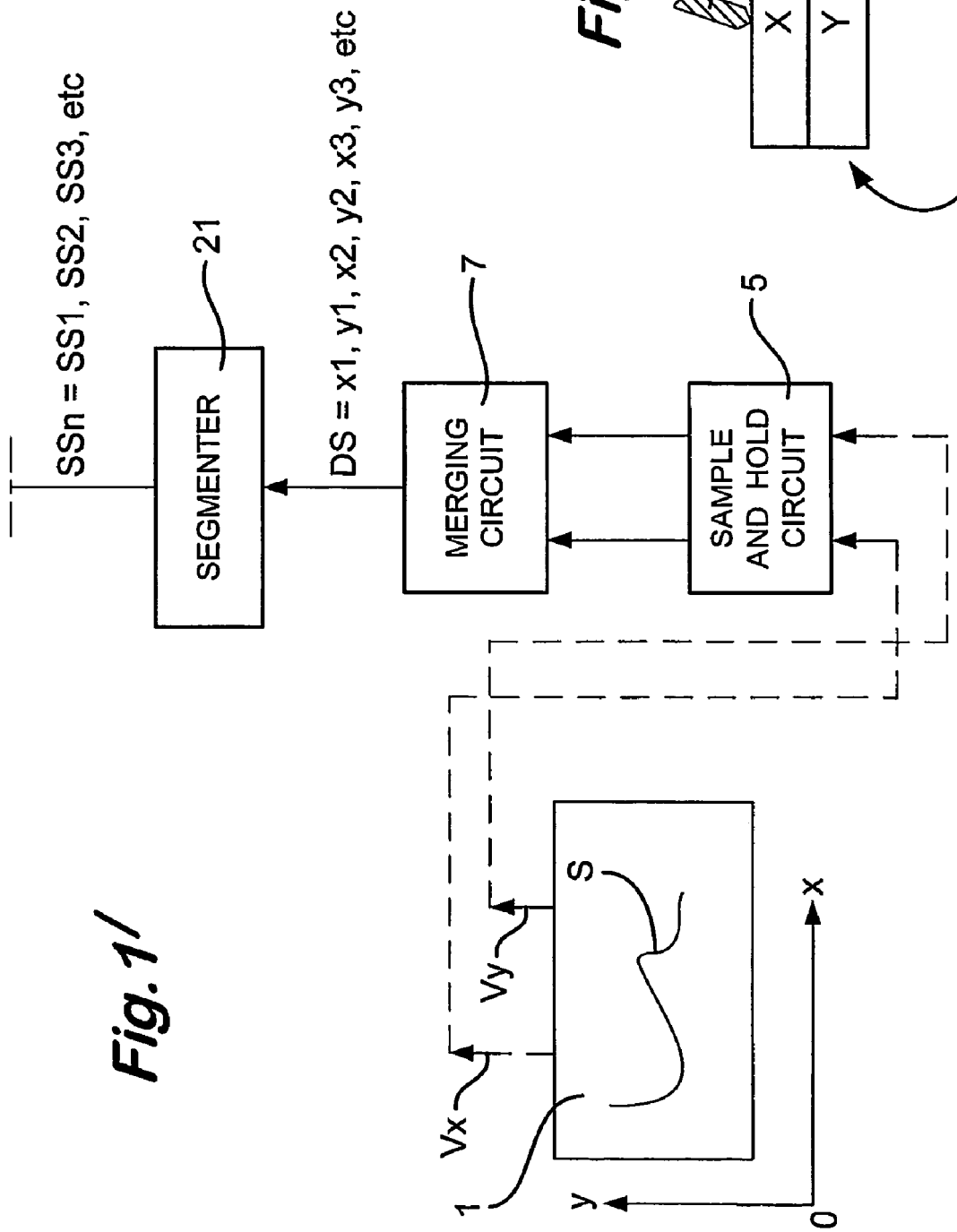

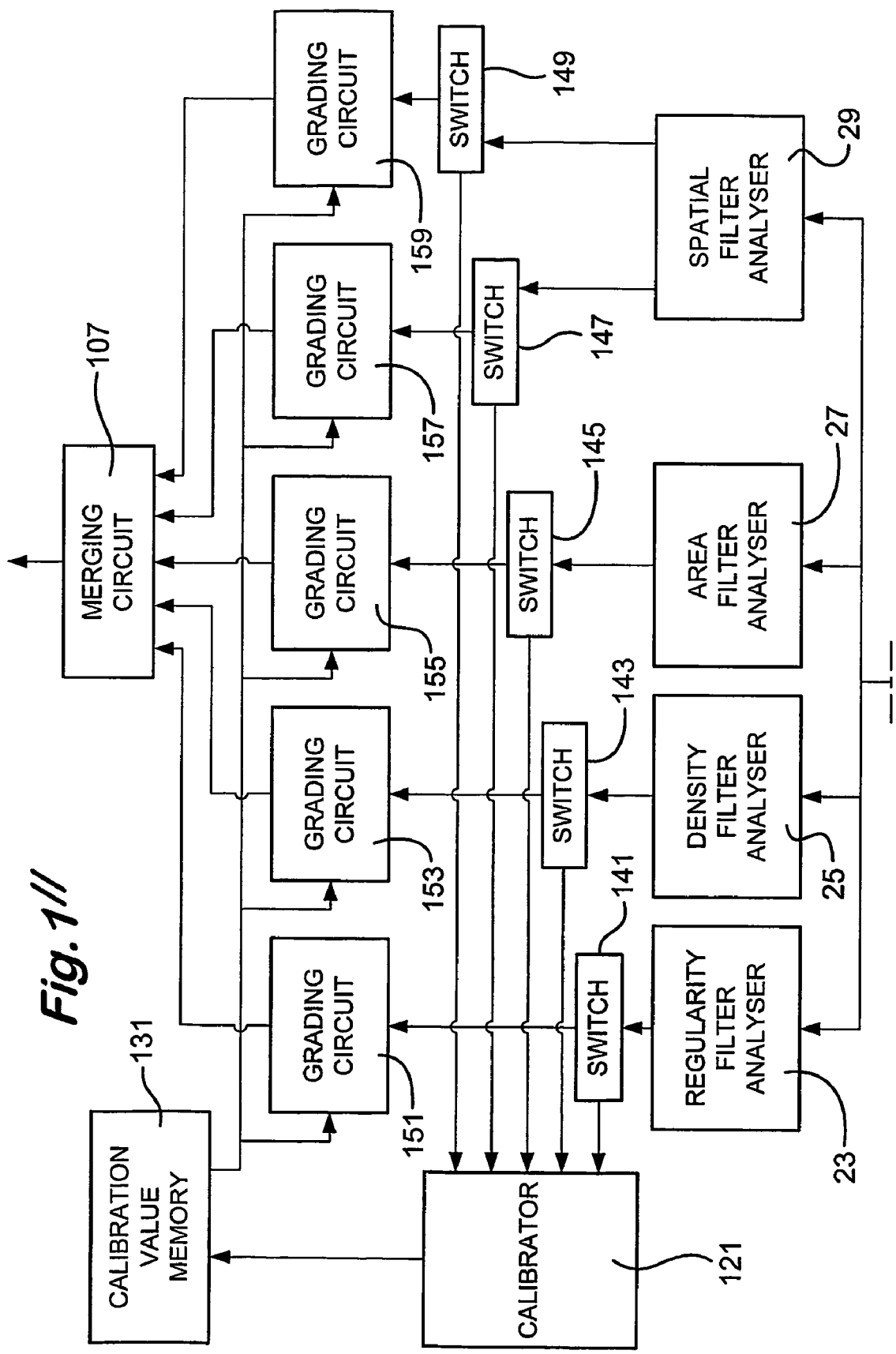
Fig.1//

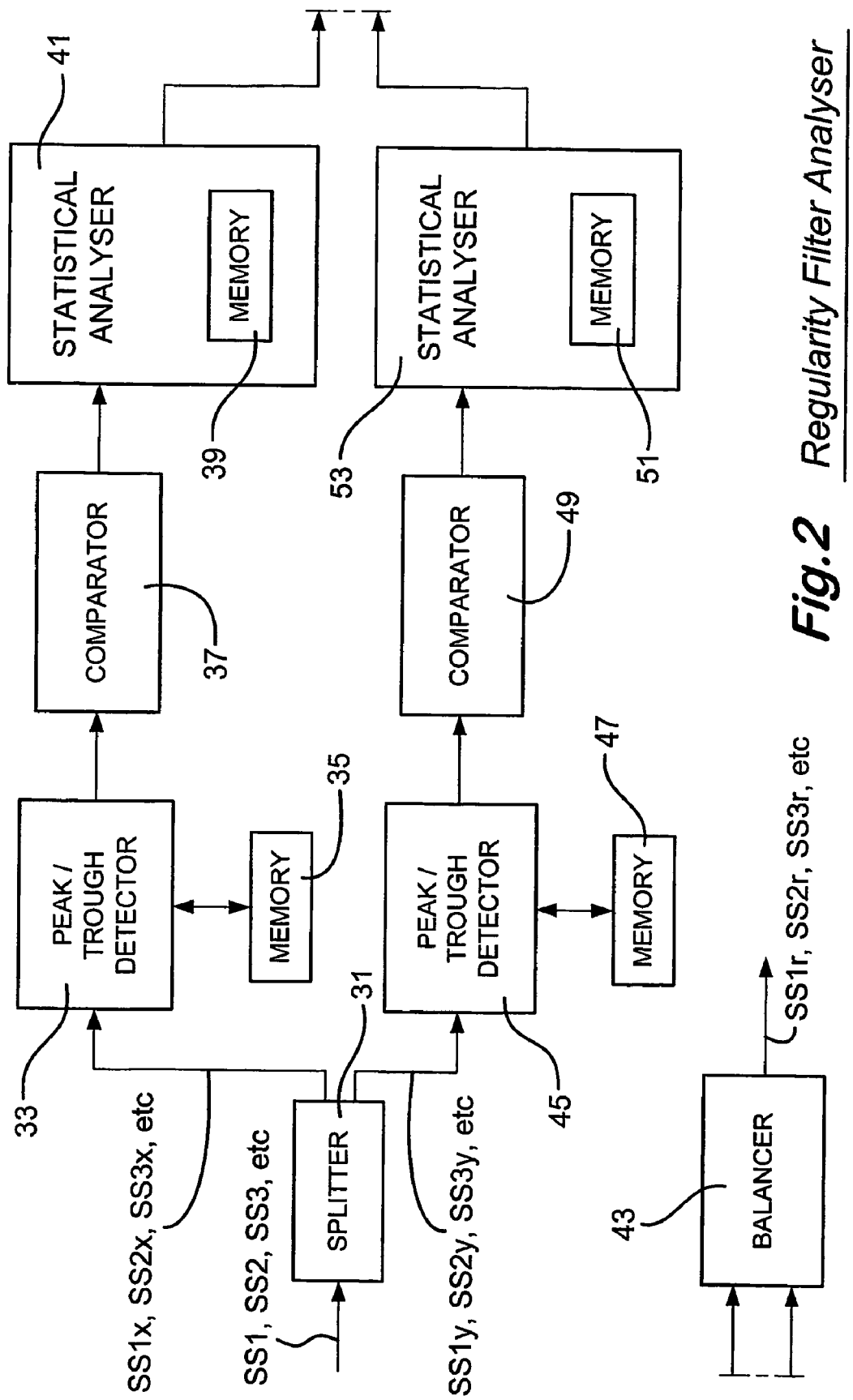
Fig.2  *Regularity Filter Analyser*

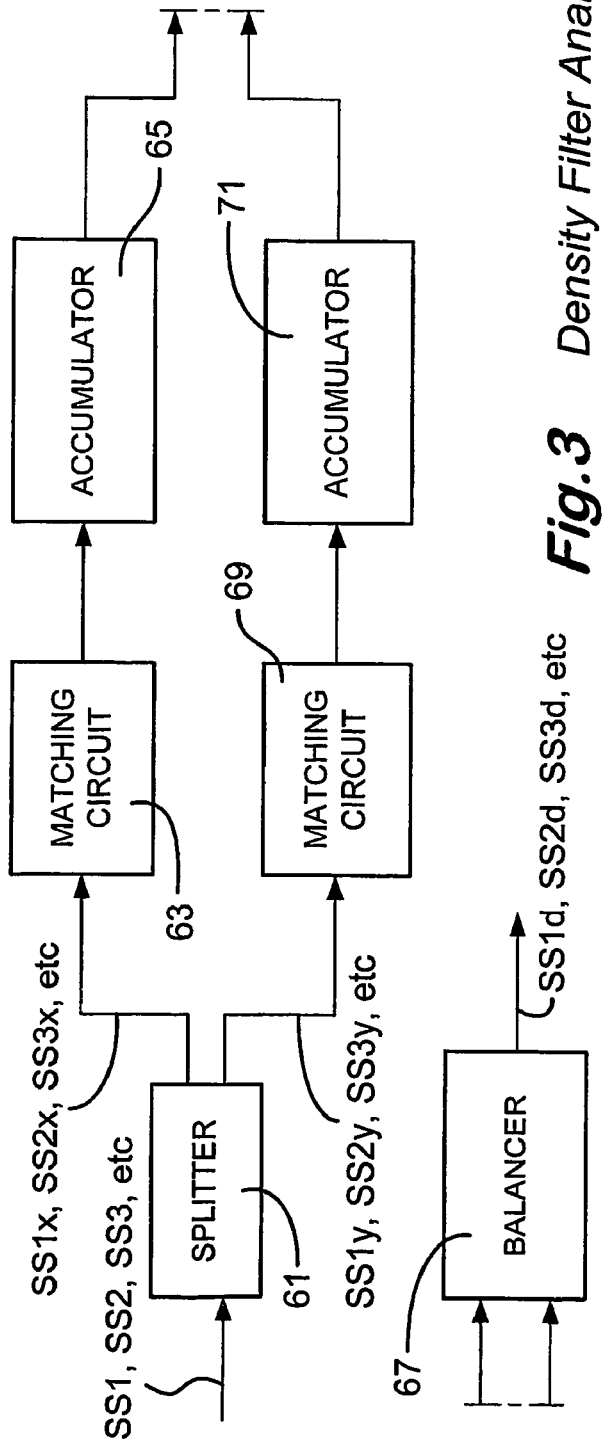
Fig.3  *Density Filter Analyser*
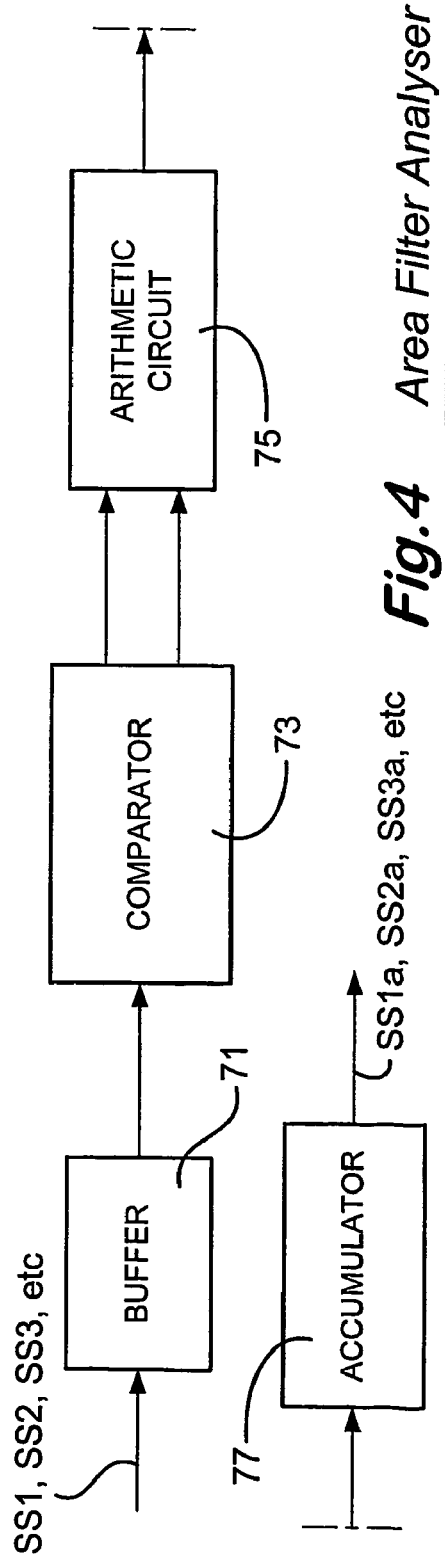
Fig.4  *Area Filter Analyser*

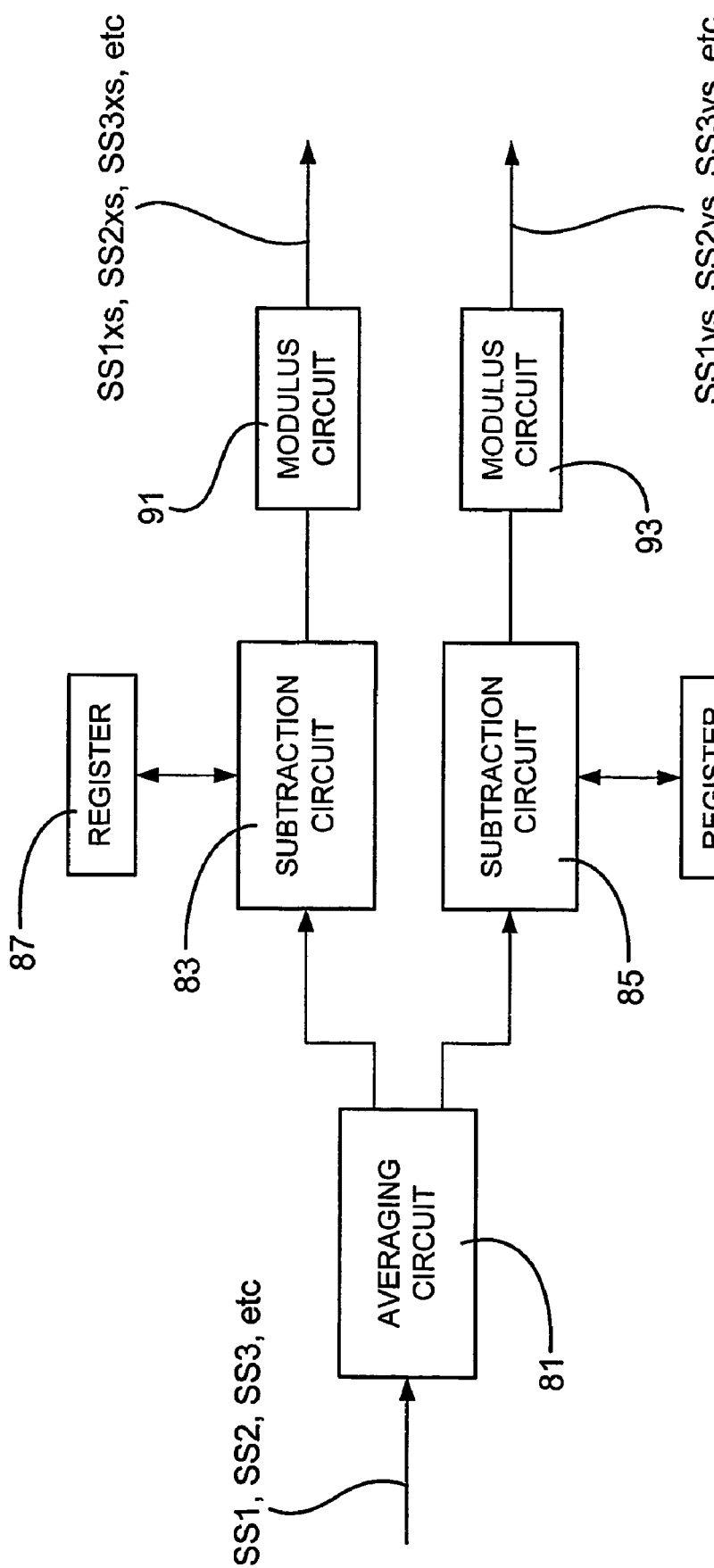
Fig. 5  *Spatial Filter Analyser*

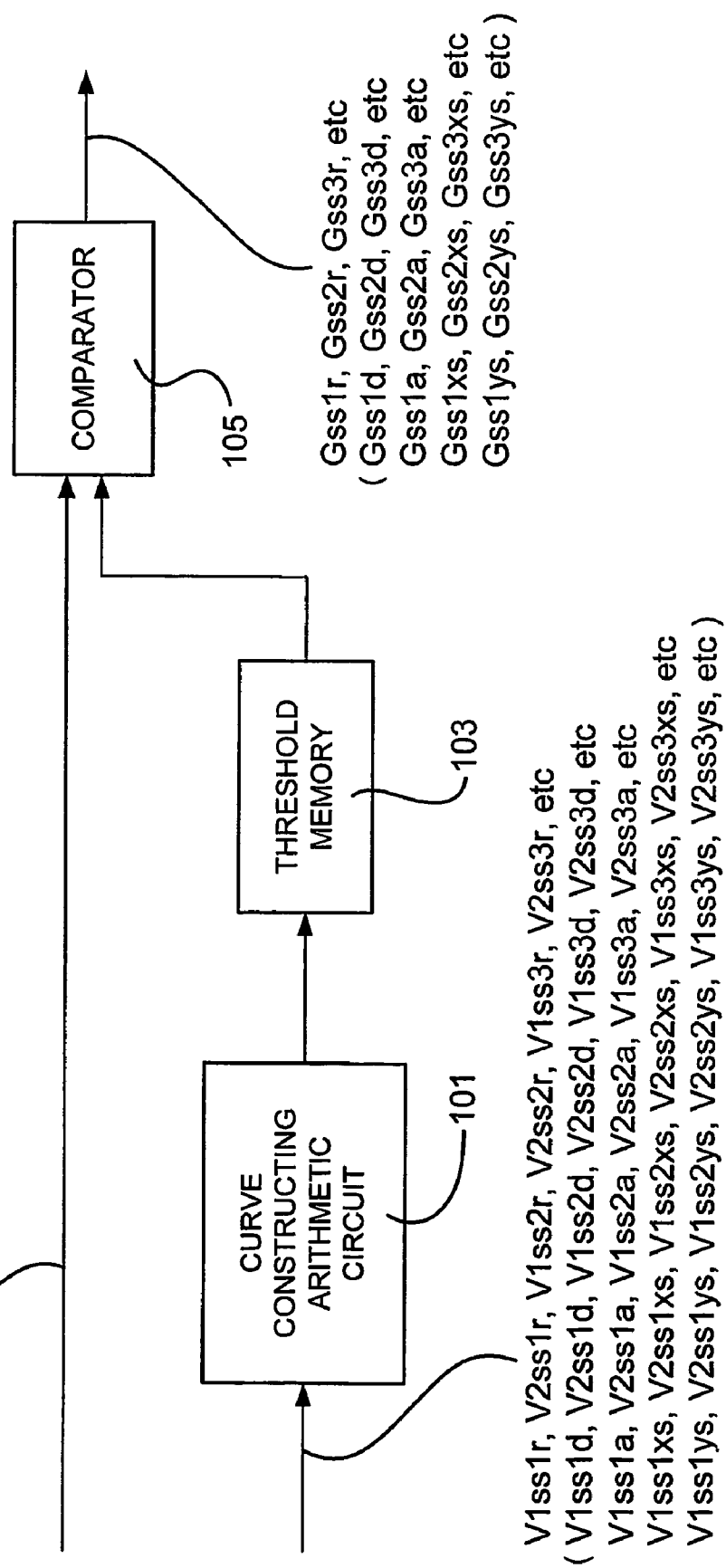
Fig.6  Grading Circuit

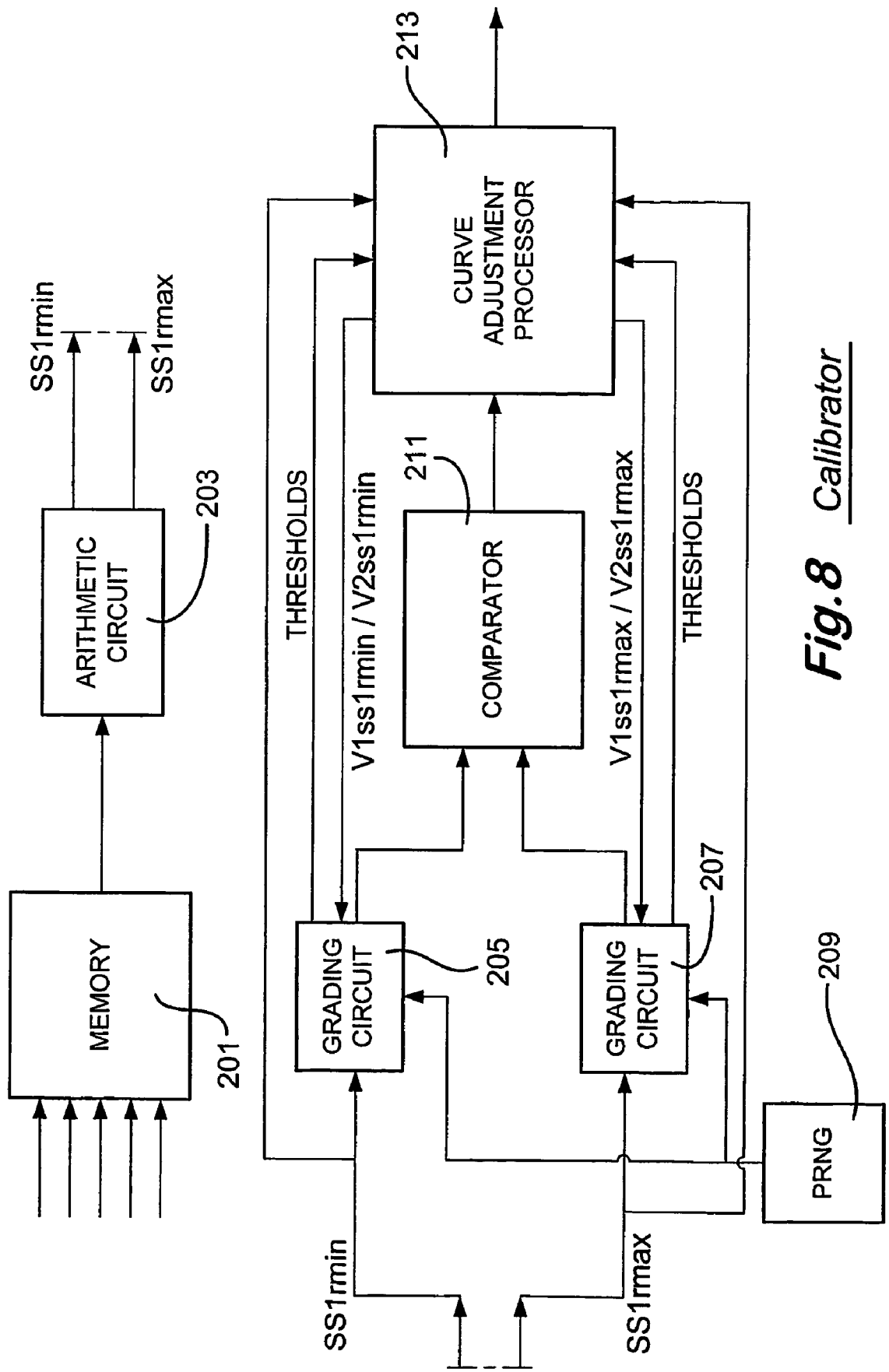
Fig. 8 *Calibrator*

SYSTEM AND METHOD FOR IDENTIFYING A USER BY GRADING A DIGITAL REPRESENTATION OF AN ANALOGUE FORM ENTERED BY THE USER

This invention relates to a system for identifying a user.

More particularly, the invention relates to such a system wherein a digital representation is derived of an analogue form entered by the user. The analogue form may be any so called biometric distinctive of the user, for example the user's handwritten signature, the user's voice, a thumb print of the user, a scan of the retina of an eye of the user.

According to a first aspect of the present invention there is provided a system for identifying a user, said system comprising: means for deriving a digital representation of an analogue form entered by the user, said analogue form being distinctive of the user; and means for grading said digital representation against a plurality of grades, said grades being defined dependent upon possible variation in said analogue form, said grades ensuring the same grading of said analogue form notwithstanding said variation, the graded digital representation constituting an identification of the user.

According to a second aspect of the present invention there is provided a method for identifying a user, said method comprising: deriving a digital representation of an analogue form distinctive of the user; and grading said digital representation against a plurality of grades, said grades being defined dependent upon possible variation in said analogue form, said grades ensuring the same grading of said analogue form notwithstanding said variation, the graded digital representation constituting an identification of the user.

A system for identifying a user in accordance with the present invention will now be described, by way of example, with reference to the accompanying drawings, in which:

FIG. 1 is a block schematic diagram of the system;

FIG. 1a is a section through a pressure sensitive screen of the system of FIG. 1;

FIG. 2 is a block schematic diagram of a regularity filter analyser of the system of FIG. 1;

FIG. 3 is a block schematic diagram of a density filter analyser of the system of FIG. 1;

FIG. 4 is a block schematic diagram of an area filter analyser of the system of FIG. 1;

FIG. 5 is a block schematic diagram of a spatial filter analyser of the system of FIG. 1;

FIG. 6 is a block schematic diagram of a grading circuit used multiple times in the system of FIG. 1;

FIG. 8 is a block schematic diagram of a calibrator of the system of FIG. 1.

Figure 7:
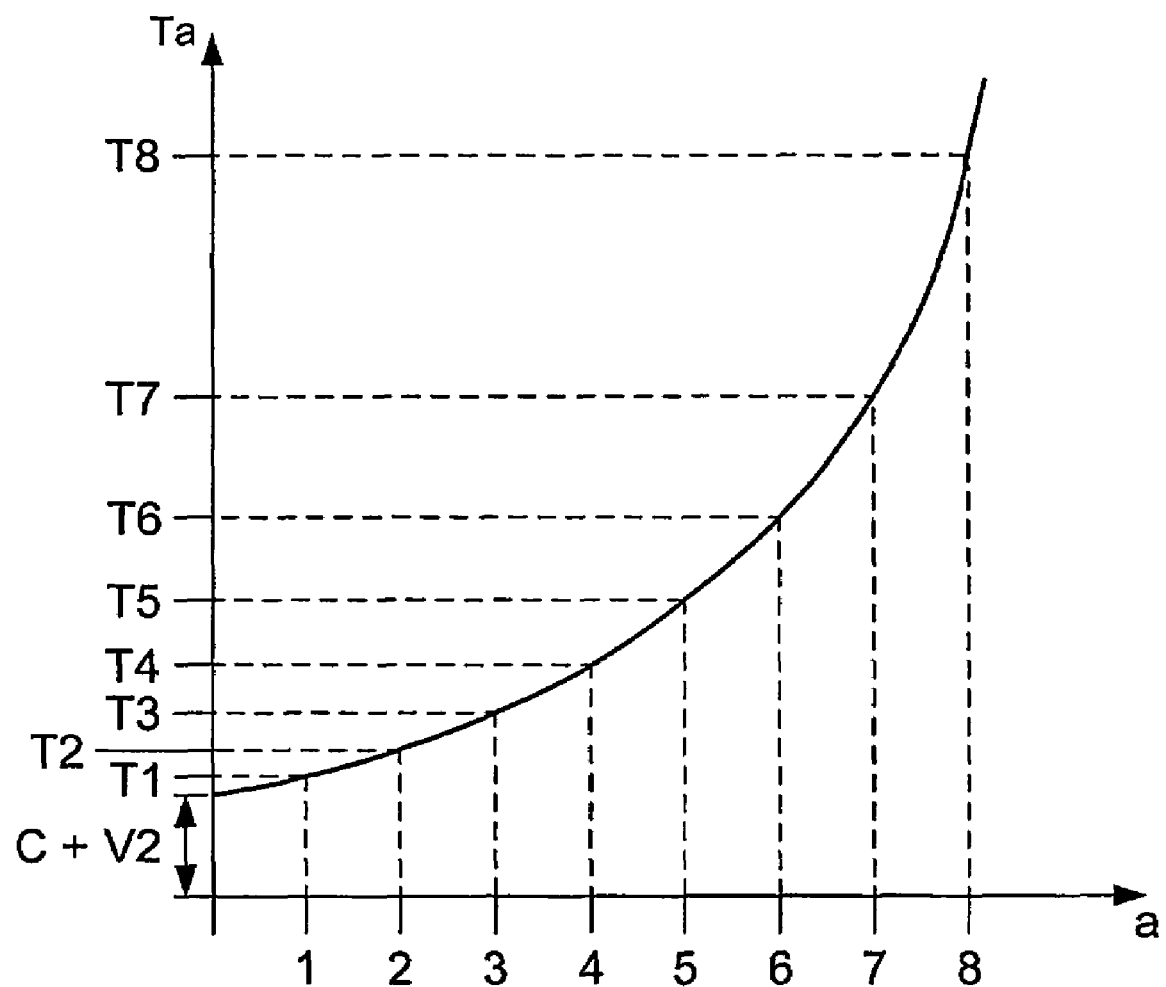
FIG. 7 is a graph illustrating a grade defining curve as constructed by a curve constructing arithmetic circuit of the grading circuit of FIG. 6.

Referring to FIGS. 1 and 1a, a user of the system signs his/her signature S on pressure sensitive screen 1 using stylus 3. A base voltage is maintained in each of the X and Y layers of screen 1. The pressure exerted on screen 1 by stylus 3 during signing alters the resistivity and therefore the base voltage of each of the X and Y layers. The alteration in the base voltage of the X layer at any instant during signing is proportional to the distance from the y axis of screen 1. Similarly, the alteration in the base voltage of the Y layer at any instant during signing is proportional to the distance from the x axis of screen 1. Thus, voltage signals Vx, Vy output by screen 1 represent the change over time of the x/y position on screen 1 of stylus 3, ie. Vx, Vy represent signature S. Sample and hold circuit 5 digitises Vx and Vy to provide DSx=x1, x2, x3, etc. and DSy=y1, y2, y3, etc, digital signals representing the x and y components respectively of signature S. Merging circuit 7 merges DSx, DSy as follows to provide digital signature DS=x1, y1, x2, y2, x3, y3, etc.

DS=x1, y1, x2, y2, x3, y3, etc., is supplied to segmenter 21 which divides DS into a series of segments SSn=SS1, SS2, SS3, etc. For example, SS1=x1, y1 to x10, y10, SS2=x11, y11 to x20, y20, SS3=x21, y21 to x30, y30, etc. Segments SSn are supplied in turn to all four filter analysers 23, 25, 27, 29. Thus, firstly SS1 is supplied to all four analysers, then SS2, then SS3, etc.

The processing of segments SSn by regularity filter analyser 23 will now be described.

Referring to FIG. 2, splitter 31 divides SS1 into its x and y components SS1$x$=x1, x2, x3, etc. and SS1$y$=y1, y2, y3, etc. The processing of SS1$x$ will now be described. Peak/trough detector 33 detects peaks/troughs present in SS1$x$. It does this by storing, in turn, in memory 35, x1, x2, x3, etc., whilst x1, x2, x3 etc. are constantly increasing/decreasing, but upon detector 33 detecting a change from increasing to decreasing or visa versa, the x values stored at that time (not including the value at which the change is detected) are summed and supplied to comparator 37. Thus, comparator 37 is supplied with a series of summation results, each of which is representative of a peak/trough in the entered signature in the x direction. Comparator 37 allots each summation result, depending upon its magnitude, to one of a number of bands or ranges of magnitude of summation result. The number of summation results (x direction peaks/troughs) falling within each band is stored in memory 39 of statistical analyser 41. Analyser 41 determines both the maximum and minimum number of peaks/troughs in a single band, and subtracts the minimum number from the maximum number. For example, of all the bands, a first band may contain the maximum number of peaks/troughs equalling 10 peaks/roughs, and a second band may contain the minimum number equalling 2 peaks/troughs. In this case, analyser 41 subtracts 2 from 10 to give 8. The result of the subtraction performed by analyser 41 is supplied to balancer 43. This result (a single number) is a measure of how broad the variation is in the number of peaks/troughs in SS1$x$ to be found in a single band. This completes the processing of SS1$x$.

The processing of SS1$y$ precisely corresponds to the processing of SS1$x$ Thus, peak/trough detector 45 detects peaks/toughs in SS1$y$, the detection involving use of memory 47. Comparator 49 allots each peak/trough to its appropriate band. The number of peaks/troughs falling within each band is stored in memory 51 of statistical analyser 53. Analyser 53 supplies to balancer 43 a measure (a single number) of how broad the variation is in the number of peaks/troughs in SS1$y$ to be found in a single band.

The processing of SS2$x$, SS2$y$, SS3$x$, SS3$y$, etc. precisely corresponds to that of SS1$x$, SS1$y$. The processing continues until the fill signature DS has been processed. Thus, balancer 43 is supplied with two series of single numbers, one of which series represents the distribution of peaks/troughs in the entered signature in the x direction, the other of which represents the same in the y direction. Balancer 43 averages the single number representing the distribution of peaks/troughs in SS1$x$ with the single number representing the distribution of peaks/troughs in SS1$y$, and provides the result at its output Balancer 43 does the same in respect of SS2$x$ and SS2$y$, SS3$x$ and SS3$y$, etc. Thus, balancer 43 provides at its output a series of averages representing the distribution of peaks/troughs in the entered signature. Let this series be denoted SS1$r$, SS2$r$, SS3$r$, etc. This series constitutes the output of regularity filter analyser 23.

The processing of segments SSn by density filter analyser 25 will now be described.

Referring to FIG. 3, splitter 61 divides SS1 into its x and y components SS1x=x1, x2, x3, etc. and SS1y=y1, y2, y3, etc. The processing of SS1x will now be described. Matching circuit 63 commences with x1 and compares it in turn to the remaining x values of SS1x, i.e., x2, x3, x4, etc. When circuit 63 detects that x1 is the same as (or is approximately the same as) another x value it increments accumulator 65 by one. For example, if circuit 63 detects that x1 is the same as x3, x7 and x9 within SS1x, the count of accumulator 65 will be 3. Matching circuit 63 then takes the next x value x2 and again compares it in turn to the remaining x values of SS1x, i.e. x1, x3, x4, x5, etc. When circuit 63 detests that x2 is the same as (or is approximately the same as) another x value it further increments accumulator 65. Extending the previous example, if circuit 63 detects that x2 is the same as x8 and x10 within SS1x, the count of accumulator 65 will be 5. Matching circuit 63 then takes the next x value x3 and again compares it in turn to the remaining x values of SS1x, ie. x1, x2, x4, x5, etc. When circuit 63 detects that x3 is the same as (or is approximately the same as) another x value it further increments accumulator 65. Extending the previous example, circuit 63 will detect that x3 is the same as x1, x7 and x9 within SS1x. Thus, the count of accumulator 65 will be 8. The process is repeated in respect of all the remaining x values of SS1x, Le. x4, x5, x6, etc. The count of accumulator 65 following the processing of SS1x by matching circuit 63 is supplied to balancer 67. Thus, accumulator 65 is supplied with a number representative of the density of the points in SS1 in the x direction.

The processing of SS1y precisely corresponds to that of SS1x. Thus, matching circuit 69 compares each y value of SS1y with the remaining y values of SS1y, and each time a match is found increments accumulator 71 by one. The total in accumulator 71 following the processing of SS1y by matching circuit 69 is also supplied to balancer 67. Thus, accumulator 71 is supplied with a number representative of the density of the points in SS1 in the y direction.

The processing of SS2x, SS2y, SS3x, SS3y etc. precisely corresponds to that of SS1x, SS1y. The processing continues until the full signature DS has been processed. Thus, balancer 67 is supplied with two series of numbers, one of which series represents the density of the entered signature in the x direction, the other of which represents the same in the y direction. Balancer 67 averages the number representing the density in SS1x with the number representing the density in SS1y, and provides the result at its output Balancer 67 does the same in respect of SS2x and SS2y, SS3x and SS3y, etc. Thus, balancer 67 provides at its output a series of averages representing the density of the entered signature. Let this series be denoted SS1d, SS2d, SS3d, etc. This series constitutes the output of density filter analyser 25.

The processing of segments SSn by area filter analyser 27 will now be described.

Referring to FIG. 4, buffer 71 buffers a predetermined number of the initially received x, y values of segment SS1. For example, consider SS1=x1, y1 to x100, y100, and buffer 71 buffers 10 received x, y values. In this case, buffer 71 will initially buffer x1, y1 to x10, y10, then, following subsequent processing of x1, y1 to x10, y10, buffer 71 buffers x11, y11 to x20, y20, then x21, y21 to x30, y30, etc. In effect, buffer 71 divides segment SS1 into 10 sub-segments, each containing 10x, y values. Comparator 73 determines the maximum and minimum y values in the sub-segment supplied to it by buffer 71, and provides these values to arithmetic circuit 75. Circuit 75 subtracts the minimum value from the maximum value, and multiplies the result by the extent of the sub-segment m the x direction Extending the previous example, the first sub-segment supplied to comparator 73 by buffer 71 will be x1, y1 to x10, y10. Assume comparator 73 determines the maximum and minimum y values in this sub-segment to be y2 and y7 respectively. Arithmetic circuit 75 calculates (y2−y7)/10 (the division is by 10 because the extent of the sub-segment in the x direction is 10x values). The result of the calculation by the arithmetic circuit 75 is supplied to accumulator 77. Thus, accumulator 77 is supplied with a measure of the area occupied by the entered signature in the first sub-segment of SS1. The process is repeated in respect of each remaining sub-segment of SS1 (nine remaining sub-segments in the previous example), each repeat increasing the amount held by accumulator 77. This results in accumulator 77 holding a value representative of the area occupied by the entered signature in segment SS1. Accumulator 77 provides this value at its output.

The processing of SS2, SS3, etc. precisely correspond to that of SS1. The processing continues until the full signature DS has been processed Thus, accumulator 77 provides at its output a series of values representative of the area occupied by the entered signature. Let this series be denoted SS1a, SS2a, SS3a, etc. This series constitutes the output of area filer analyser 27.

The processing of segments SSn by spatial filter analyser 29 will now be described.

Referring to FIG. 5, averaging circuit 81 calculates the average x and the average y value present in SS1, i.e. circuit 81 (i) sums all the x values present in SS1 and divides the result by the number of x values, and (ii) sums all the y values present in SS1 and divides the result by the number of y values. Circuit 81 supplies the average x value to subtraction circuit 83, and the average y value to subtraction circuit 85. Since SS1 is the first segment of signature DS, circuit 83 places the average x value in 5S1 in register 87, and circuit 85 places the average y value in SS1 in register 89.

Averaging circuit 81 now calculates the average x and y values present in SS2, and supplies these values to subtraction circuits 83 and 85 respectively. Circuit 83 subtracts the average x value in SS1 currently stored in register 87 from the average x value in SS2, and supplies the result to modulus circuit 91. Circuit 83 then replaces the average x value in SS1 stored in register 87 with the average x value in SS2. Modulus circuit 91 takes the positive of the result of subtracting the average x value in SS1 from the average x value in SS2, and provides the positive value at its output. Thus, circuit 91 provides at its output a value representative of the magnitude of the shift in the mean x position of the signature from segment SS1 to segment SS2. In corresponding manner to circuit 83, circuit 85 subsets the average y value in SS1 currently stored in register 89 from the average y value in SS2, and supplies the result to modulus circuit 93. Circuit 85 then replaces the average y value in SS1 stored in register 89 with the average y value in SS2. Modulus circuit 93 takes the positive of the result of subtracting the average y value in SS1 from the average y value in SS2, and provides the positive value at its output. Thus, circuit 93 provides at its output a value representative of the magnitude of the shift in the mean y position of the signature from segment SS1 to segment SS2.

The processing of SS3, SS4, etc. precisely corresponds to that of SS2. Thus, the processing of SS3 results in modulus circuits 91, 93 providing values representing the magnitude of the shift in the mean x, y positions of the signature from segment SS2 to segment SS3, and the processing of SS4 results in modulus circuits 91, 93 providing values representing the magnitude of the shift in the mean x, y positions of the signature from segment SS3 to segment SS4, etc. The processing continues until the full signature has been processed. Thus, modulus circuit 91 provides a series of values which represents the change in the mean x position of the signature, and modulus circuit 93 provides a series of values which represents the change in the mean y position of the signature. Let these series be denoted SS1$xs$, SS2$xs$, SS3$xs$, etc. and SS1$ys$, SS2$ys$, SS3$ys$, etc., respectively. These two series constitute the two outputs of spatial filter analyser 29.

In normal operation of the system, i.e. operation of the system following its calibration, each switch 141, 143, 145, 147, 149 switches the input it receives from a filter analyser 23, 25, 27, 29 to a respective grading circuit 151, 153, 155, 157, 159. In calibration of the system, each switch 141, 143, 145, 147, 149 switches its input to calibrator 121. Calibration of the system will be described later.

There will now be described the processing by grading circuit 151 of the output SS1$r$, SS2$r$, SS3$r$, etc. of regularity filter analyser 23.

Referring to FIG. 6, curve constituting arithmetic circuit 101 utilises two calibration values V1$ss1r$ and V2$ss1r$ stored in calibration value memory 131 in respect of SS1$r$, to construct a curve according to the equation Ta=C(V1$ss1r$)$^a$+V2$ss1r$, where C is a constant, and a is incremented from one to a value equal to the number of grades into which SS1$r$ is to be classified. For each value of a, Ta is calculated according to the equation. For example, if a is incremented to the value of 8, T1=C(V1$ss1r$)+V2$ss1r$, T2=C(V1$ss1r$)$^2$+V2$ss1r$, T3=C(V1$ss1r$)$^3$+V2$ss1r$, etc., and circuit 101 constructs a curve as shown in FIG. 7. The calculated Ta (T1 to T8 in the example) are the thresholds used to grade SS1$r$. These thresholds Ta are supplied to threshold memory 103. Comparator 105 compares SS1$r$ received from regularity filter analyser 23 against thresholds Ta, and decides which grade to assign to SS1$r$, i.e. the grade corresponding to a value less than T1, the grade corresponding to a value between T1 and T2, the grade corresponding to a value between T2 and T3, etc. The assigned grade Gss1$r$ is supplied to merging circuit 107.

The processing of SS2$r$, SS3$r$, SS4$r$, etc. precisely corresponds to that of SS1$r$. Thus, in respect of each SSr its corresponding calibration values V1$ssr$, V2$ssr$ are used to construct a curve according to the equation Ta=C(V1$ssr$)$^a$+V2$ssr$, providing thresholds Ta which are used to grade the SSr. The number of thresholds is the same for each SSr, ie. 'a' in the equation is incremented from one to the same value (eight in the example) for each SSr. However, the precise positions of the thresholds for each SSr will be different, since this position depends on the particular calibration values V1$ssr$, V2$ssr$ for the SSr being graded.

The processing continues until the SSr in respect of the full signature DS have been graded. Thus, comparator 105 provides at its output a series of grades Gssr=Gss1$r$, Gss2$r$, Gss3$r$, etc., each of which grades is a measure of the distribution of peaks/troughs in the segment SSn of the signature DS in respect of which the grade was assigned. It will be appreciated that the number of possible different values in the series output by comparator 105, will equal the number of grades (eight in the example) against which the SSr output by regularity filter analyser 23 are classified.

The following processing precisely corresponds to the processing by grading circuit 151 of the output SS1$r$, SS2$r$, SS3$r$, etc. of regularity filter analyser 23: (i) the processing by grading circuit 153 of the output SS1$d$, SS2$d$, SS3$d$, etc. of density filter analyser 25; (ii) the processing by grading circuit 155 of the output SS1$a$, SS2$a$, SS3$a$, etc. of area filter analyser 27; (ii) the processing by grading circuit 157 of one output SS1$xs$, SS2$xs$, SS3$xs$, etc. of spatial filter analyser 29; and (iv) the processing by grading circuit 159 of the other output SS1$ys$, SS2$ys$, SS3$ys$, etc. of spatial filter analyser 29.

In grading circuit 153, in respect of each SSd, its corresponding calibration values V1$ssd$, V2$ssd$ are used to construct a curve according to the equation Ta=C(V1$ssd$)$^a$+V2$ssd$, providing Ta thresholds which are used to grade the SSd. Thus, grading circuit 153 provides at its output a series of grades Gssd=Gss1$d$, Gss2$d$, Gss3$d$, etc., each of which grades is a measure of the density in the segment of the signature in respect of which the grade was assigned.

In grading circuit 155, in respect of each SSa, its corresponding calibration values V1$ssa$, V2$ssa$ are used to construct a curve according to the equation Ta=C(V1$ssa$)$^a$+V2$ssa$, providing Ta thresholds which are used to grade the SSa. Thus, grading circuit 155 provides at its output a series of grades Gssa=Gss1$a$, Gss2$a$, Gss3$a$, etc., each of which grades is a measure of the area in the segment of the signature in respect of which the grade was assigned.

In grading circuit 157, in respect of each SSxs, its corresponding calibration values V1$ssxs$, V2$ssxs$ are used to construct a curve according to the equation Ta=C(V1$ssxs$)$^a$+V2$ssxs$, providing Ta thresholds which are used to grade the SSxs. Thus, grading circuit 157 provides at its output a series of glades Gssxs=Gss1$xs$, Gss2$xs$, Gss3$xs$, etc., each of which grades is a measure of the mean x position in the segment of the signature in respect of which the grade was assigned.

In grading circuit 159, in respect of each SSys, its corresponding calibration values V1$ssys$, V2$ssys$ are used to construct a curve according to the equation Ta=C(V1$ssys$)$^a$+V2$ssys$, providing Ta thresholds which are used to grade the SSys. Thus, grading circuit 159 provides at its output a series of grades Gssys=Gss1$ys$, Gss2$ys$, Gss3$ys$, etc., each of which grades is a measure of the mean y position in the segment of the signature in respect of which the grade was assigned.

Merging circuit 107 merges Gssr, Gssd, Gssa, Gssxs, Gssys as follows and provides the result as its output: Gss1$r$, Gss1$d$, Gss1$a$, Gss1$xs$, Gss1$ys$, Gss2$r$, Gss2$d$, Gss2$a$, Gss2$xs$, Gss2$ys$, Gss3$r$, Gss3$d$, Gss3$a$, Gss3$xs$, Gss3$ys$, etc. Thus, the output of merging circuit 107 represents the peaks/troughs, density, area, and mean x/y position of the entered signature. The output of merging circuit 107 can be considered a digital representation of the entered signature.

It is the intention that the system be capable of reliably reproducing one and the same digital representation of the true user's signature for the purpose of reliably identifying that person. In order to do this, the system must be capable of tolerating variation in that person's signature, i.e. one and the same digital representation of the true user's signature must be provided by the system, notwithstanding that the true user will not reproduce precisely the same signature each time. Further, the degree of toleration by the system of variation in the true user's signature, must not be such that another person can forge the true user's signature, and be identified by the system as the true user.

Grading circuits 151, 153, 155, 157, 159 provide tolerance of variation in the true user's signature. The precise positions of the thresholds used by the grading circuits determine the grades applied. The thresholds must be such that a given aspect (peak/troughs, density, area, mean x/y position) of a given segment of the true user's signature will be assigned the same grade from one reproduction by the true user of his/her signature to the next, despite variation in the signature. However, the thresholds must not be such as to allow the system to be fooled. The precise position of the thresholds used in respect of a given aspect of a given signature segment are determined by the calibration values V1, V2 stored in calibration value memory 131 in respect of that aspect of that signature segment. These calibration values are determined in calibration of the system as will now be described.

Calibration is based on a number of sample signatures entered by the true user. Each sample signature is digitised, segmented, and analysed, so as to provide outputs by filter analysers 23, 25, 27, 29. As mentioned earlier, in calibration, each switch 141, 143, 145, 147, 149 switches the input it receives from a filter analyser 23, 25, 27, 29 to calibrator 121.

Referring to FIG. 8, the SSr, SSd, SSa, SSxs, SSys in respect of each sample signature are stored in memory 201. The processing of the output of regularity filter analyser 23 in respect of the first segment of each sample signature will now be described. Let this output in respect of the first sample signature be 1SS1$r$, in respect of the second sample signature be 2SS1$r$, in respect of the third sample signature be 3SS1$r$, etc. Arithmetic circuit 203 determines the minimum SS1$r$min and maximum SS1$r$max of the 1SS1$r$, 2SS1$r$, 3SS1$r$, etc., and supplies the minimum SS1$r$min to grading circuit 205 and the maximum SS1$r$max to grading circuit 207. The operation of grading circuits 205, 207 precisely corresponds to that of grading circuits 151, 153, 155, 157, 159. Thus, grading circuit 205 constructs a curve according to the equation $Ta=C(V1ss1rmin)^a+V2ss1rmin$, providing thresholds Ta which are used to grade SS1$r$min. V1$ss$1$r$min is chosen randomly and provided by pseudo random number generator 209. V2$ss$1$r$min is set to zero. The grade Gmin assigned to SS1$r$min is supplied to comparator 211. Similarly, grading circuit 207 constructs a curve according to the equation $Ta=C(V1ss1rmax)^a+V2ss1rmax$, providing thresholds Ta which are used to grade SS1$r$max. V1$ss$1$r$max is the same as V1$ss$1$r$min as provided by pseudo random number generator 209. V2$ss$1$r$max is also set to zero. The grade Gmax assigned to SS1$r$max is supplied to comparator 211. Comparator 211 supplies the difference between Gmin and Gmax to curve adjustment processor 213.

It is to be understood that the aim is that Gmin and Gmax are the same grade, since SS1$r$min and SS1$r$max are considered the minimum and maximum possible measures of the peaks/troughs in the first segment of the true user's signature. Accordingly, the system, once calibrated, must be tolerant of these minimum and maximum measures, i.e. it must assign them to the same grade, otherwise the true user will not be reliably identified by the system, as it will represent his/her signature in different ways, i.e. by different series of grades. Further, the system, once calibrated, must not be tolerant of measures slightly below SS1$r$min and above SS1$r$max, i.e. should grade these measures differently to SS1$r$min and SS1$r$max, otherwise the system is liable to be fooled, since such measures do not represent the true user's signature. Thus, SS1$r$min and SS1$r$max should fall within the same grade, but SS1$r$min should be just above the lower threshold of the grade, and SS1$r$max just below the higher threshold of the grade. The setting of the precise position of the thresholds used to grade SS1$r$ occurs as follows.

If Gmin is a different grade to Gmax, then processor 213 incrementally increases V1$ss$1$r$min=V1$ss$1$r$max until Gmin is an adjacent grade to Gmax. Of course, if Gmin is already an adjacent grade to Gmax this need not be done. It will be appreciated from a consideration of the behaviour of equation $Ta=C(V1ss1rmin \text{ or } V1ss1rmax)^a$ if V1$ss$1$r$min or V1$ss$1$r$max is increased, that such an increase will result in a general raising of each grade in addition to an increase in the range of each grade. Thus, increasing V1$ss$1$r$min=V1$ss$1$r$max will lead to Gmin being an adjacent grade to Gmax. Once Gmin is an adjacent grade to Gmax, processor 213 further fractionally increases V1$ss$1$r$min=V1$ss$1$r$max until the range of the grade Gmin is greater than the difference between SS1$r$min and SS1$r$max. Of course, if this is already the case there is no need to fractionally increase V1$ss$1$r$min/V1$ss$1$r$max.

Once the range of the grade Gmin is greater than the difference between SS1$r$min and SS1$r$max, processor 213 raises grade Gmin by an amount equal to SS1$r$min minus the lower threshold of Gmin, to bring both SS1$r$min and SS1$r$max into the same grade Gmin. Processor 213 does this by setting V2$ss$1$r$min=V2$ss$1$r$max equal to SS1$r$min minus the lower threshold of Gmin. It will be appreciated from a consideration of the behaviour of equation $Ta=C(V1ss1rmin \text{ or } V1ss1rmax)^a+(V2ss1rmin \text{ or } V2ss1rmax)$ if V2$ss$1$r$min or V2$ss$1$r$max is increased, that such an increase will result in a general raising of each grade by the amount V2$ss$1$r$min or V2$ss$1$r$max is increased, but will pot result in any increase in the range of each grade.

Processor 213 has now achieved the aim of SS1$r$min and SS1$r$max falling within the same grade, with SS1$r$min just above the lower threshold of the grade, and SS1$r$max just below the higher threshold of the grade. The two values of V1$ss$1$r$min=V1$ss$1$r$max, and V2$ss$1$r$min=V2$ss$1$r$max, which have achieved this, are stored in calibration value memory 131 in respect of SS1$r$, as the two calibration values V1$ss$1$r$ and V2$ss$1$r$ to be used in normal operation of the system to construct a curve according to equation $Ta=C(V1ss1r)^a+V2ss1r$, providing thresholds Ta which are used to grade SS1$r$.

The preceding three paragraphs concern the case where Gmin is a different grade to Gmax, following a random choice of V1$ss$1$r$min=V1$ss$1$r$max, and setting V2$ss$1$r$min=V2$ss$1$r$max to zero. In the case where Gmin is the same grade as Gmax, processor 213 adjusts the values of V1$ss$1$r$min, V1$ss$1$r$max, V2$ss$1$r$min, V2$ss$1$r$max to ensure that, as required, SS1$r$min and SS1$r$max fall just inside the grade and not well inside. Processor 213 fractionally decreases V1$ss$1$r$min=V1$ss$1$r$max until the range of the single grade containing SS1$r$min and SS1$r$max becomes less than the difference between SS1$r$min and SS1$r$max. If, at anytime during this fractional decrease, SS1$r$min and SS1$r$max cease to fall within the same grade, processor 213 sets V2$ss$1$r$min=V2$ss$1$r$max equal to SS1$r$max minus the lower threshold of the grade containing SS1$r$max, and then continues the fractional decrease. Once the range of the single grade containing SS1$r$min and SS1$r$max becomes less than the difference between SS1$r$min and SS1$r$max, processor 213 reverts to the value of V1$ss$1$r$min=V1$ss$1$r$max immediately preceding the current value. The two values V1$ss$1$r$min=V1$ss$1$r$max and V2$ss$1$r$min=V2$ss$1$r$max are then stored in calibration value memory 131 in respect of SS1$r$, as the two calibration values V1$ss$1$r$ and V2$ss$1$r$ to be used in normal operation of the system to construct a curve according to equation $Ta=C(V1ss1r)^a+V2ss1r$, providing thresholds Ta which are used to grade SS1$r$.

The processing of the output of regularity filter 23 in respect of the second, third, fourth, etc. segments of each sample signature (i.e. the processing of 1SS2$r$, 2SS2$r$, 3SS2$r$, etc.—second segment, 1SS3$r$, 2SS3$r$, 3SS3$r$, etc.—third segment, 1SS4$r$, 2SS4$r$, 3SS4$r$, etc.—fourth segment) precisely corresponds to that of the output of regularity filter 23 in respect of the first segment of each sample signature, i.e. 1SS1$r$, 2SS1$r$, 3SS1$r$, etc. Thus, in respect of each segment, curve adjustment processor 213 of calibrator 121, adjusts a grading curve until SSrmin and SSrmax fall just within the same grade, the calibration values V1$ssr$ and V2$ssr$ which achieve this being stored in calibration value memory 131. Thus, calibration value memory 131 stores in respect of each signature segment two calibration values V1$ssr$, V2$ssr$, to be used by grading circuit 151 when grading the output of regularity filter analyser 23.

The processing of the sample signature output (as stored in memory 201) of each of the remaining filter analysers, i.e. density filter analyser 25, area filter analyser 27, and spatial filter analyser 29, precisely corresponds to that of regularity filter analyser 23. Thus, calibration value memory 131 stores the following in respect of each signature segment: two calibration values V1$ssr$, V2$ssr$ to be used by grading circuit 151 when grading the output of regularity filter analyser 23; two calibration values V1$ssd$, V2$ssd$ to be used by grading circuit 153 when grading the output of density filter analyser 25; two calibration values V1$ssa$, V2$ssa$ to be used by grading circuit 155 when grading the output of area filter analyser 27; two calibration values V1$ssxs$, V2$ssxs$ to be used by grading circuit 157 when grading one output of spatial filter analyser 29; and two calibration values V1$ssys$, V2$ssys$ to be used by grading circuit 159 when grading the other output of spatial filter analyser 29.

It will be appreciated that the grades applied by grading circuits 151, 153, 155, 157, 159 are determined based on possible variation in the true user's signature, so that such variation will not result in the assignation of different grades from one reproduction by the true user of his/her signature to the next. In effect, therefore, the function of the grading circuits is to derive, from a variant digital representation of the true user's signature, i.e. the representation provided by filter analysers 23, 25, 27, 29, an invariant digital representation, i.e. the output of grading circuits 151, 153, 155, 157, 159 as merged by merging circuit 107. The system, once calibrated, reliably identifies the true user by reliably providing one and the same digital representation of the true user's signature, i.e. by reliably assigning the same grades to the true user's signature. If an entered signature does not result in the system providing the same digital representation as that of the true user, i.e. does not assign the same grades as those of the true user, then the person who entered the signature is not the true user.

It will now be explained why it is particularly advantageous to be able to reliably provide one and the same, i.e. an invariant digital representation of the true user's signature, notwithstanding variation in the signature.

It is to be appreciated that known systems for identifying a user are not capable of providing an invariant digital representation of the true user's signature. Such systems merely derive a digital representation of the entered signature, which, if the true user's, will vary with variation in the signature. A comparison is then made between the digital representation of the entered signature and a stored sample digital representation known to be of the signature of the true user. Provided the entered and stored signatures match to a given tolerance, the entered signature is passed. A distinct disadvantage with such known systems is that there remains stored in the system the sample digital representation of the true user, which sample may be discovered and used by a person intending to misrepresent himself/herself as the true user. This problem may be overcome by use of the facility provided by the present invention of an invariant digital representation of the true user's signature. The following are three examples of the use of this facility.

In the first example, the invariant digital representation of the true user's signature is used to symmetrically encrypt the true user's private key in a public key cryptography secure communication scheme. The private key in encrypted form is stored. The invariant digital representation of the true user's signature is not stored. An entered true user's signature will successfully decrypt the encrypted private key, enabling the key to be used for secure communication. An entered signature that is not the true user's, will not successfully decrypt the encrypted private key.

In the second example, a data set is symmetrically encrypted using the true user's invariant digital representation. The encrypted data set is stored. A hash sum of the unencrypted data set is also stored. The invariant digital representation is not stored. An entered true user's signature will successfully decrypt the encrypted data set, recovering the data set. Consequently, the hash sum of the recovered data set will be the same as stored. An entered signature that is not the true user's, will not successfully recover the data set. Consequently, the hash sum of whatever data set results from the unsuccessful decryption, will not be the same as stored.

In the third example, the true user's invariant digital representation is used to seed a pseudo random number generator to provide in known manner a private/public key pair for use by the true user in a public key cryptography secure communication scheme. Each time the true user enters his/her signature, the system provides the true user's private/public key pair. This has the advantage that neither the true user's invariant digital representation nor the true user's private/public key pair is stored. A signature which is not the true user's will not result in provision of the invariant digital representation, and consequently will not result in provision of the true user's private/public key pair.

The above description is of an implementation of the present invention to identify a user by means of his/her handwritten signature. It will be appreciated that the invention may also be implemented to identify a user by means of any so called biometric distinctive of the user, for example the user's voice, a thumb print of the user, a scan of the retina of an eye of the user.

In the case of the user's voice, an implementation of the present invention corresponding to that described above for the user's signature, would be as follows. The user would speak to the system a predetermined phrase, which would be digitised and segmented by the system. Filter analysers analogous to filter analysers 23, 25, 27, 29 would analyse various aspects of the dig spoken predetermined phrase to provide a variant digital representation thereof. Grading circuits analogous to grading circuits 151, 153, 155, 157, 159 would grade the variant digital representation to provide an invariant digital representation of the spoken predetermined phrase. The calibration values used by the grading circuits, specific to each phrase segment and each aspect analysed, would be derived by a calibrator analogous to calibrator 121, based on a number of sample predetermined phrases spoken by the true user.

In the case of a user's thumb print/eye retina scan, the present invention could be implemented in corresponding manner to that described in the previous paragraph. In this regard, it will be realised that variation in a true user's thumb print/eye retina scan will not be as great as variation in a true user's handwritten signature/spoken predetermined phrase. This will be reflected in the calibration values V1 and V2 determined during calibration, since V1 and V2 would be determined based on min/max values representing the extent of possible variation in the true user's thumb print/eye retina scan.

The invention claimed is:

1. A system for identifying a user, said system comprising:
    means for deriving a digital representation of an analogue form entered by the user, said analogue form being distinctive of the user; and
    means for grading said digital representation against a plurality of grades, said grades being defined dependent upon possible variation in said analogue form, said grades ensuring the same grading of said analogue form notwithstanding said variation, the graded digital representation constituting an identification of the user, said grades being defined by an equation $Ta=C(V1)^a+(V2)$, where Ta are the grade thresholds, "a" is incremented from one to a value equal to a number of grades required, C is a constant, and V1 and V2 represent possible variation in said analogue form, said plurality of grades against which said digital representation is graded determining whether there is identification or not of the user.

2. The system according to claim 1, further comprising calibration means for determining values of V1 and V2, said calibration means comprising: means for determining minimum and maximum values which represent the extent of possible variation in said analogue form, said minimum and maximum values being determined from a number of sample analogue forms entered into the system by the user; and means for determining values of V1 and V2 which, when substituted into said equation, provide grades which classify said minimum and maximum values in one and the same grade.

3. The system according to claim 2, wherein said means for determining values of V1 and V2 repeatedly trials values of V1 and V2 to provide grades which classify said minimum and maximum values in one and the same grade, each said trial being followed by a calculated adjustment to the value of V1 or V2.

4. The system according to claim 3, wherein said repeated trials are also to provide grades wherein a range of said one and the same grade is greater than, but substantially equal to, a difference between said minimum and maximum values.

5. The system according to claim 1, wherein said means for deriving a digital representation comprises: means for digitizing said entered analogue form; and means for analyzing at least one aspect of the digitized entered analogue form, thereby to provide in respect of at least one aspect an aspect output indicative thereof, the at least one aspect output constituting said digital representation of the entered analogue form, said means for grading said digital representation grading the at least one aspect output against a said plurality of grades defined dependent upon possible variation in the aspect output due to variation in that aspect of said analogue form.

6. The system according to claim 5, wherein said means for deriving a digital representation further comprises means for segmenting said digitized entered analogue form, said means for analyzing at least one aspect of the digitized entered analogue form analyzing said at least one aspect in respect of each segment of the entered analogue form, said means for grading said digital representation grading at least one aspect output in respect of each said segment against a said plurality of grades defined dependent upon possible variation in the aspect output in respect of that segment due to variation in that aspect in that segment of said analogue form.

7. The system according to claim 6, wherein said analogue form is a handwritten signature.

8. The system according to claim 7, wherein said at least one aspect of the digitized entered handwritten signature is selected from a group consisting of peaks and troughs in each segment of the entered signature; density of each segment of the entered signature; area of each segment of the entered signature; and relative mean position of each segment of the entered signature.

9. A method of identifying a user, said method comprising the steps of:
a) deriving a digital representation of an analogue form distinctive of the user; and b) grading said digital representation against a plurality of grades, said grades being defined dependent upon possible variation in said analogue form, said grades ensuring the same grading of said analogue form notwithstanding said variation, the graded digital representation constituting an identification of the user, and defining said grades by an equation $Ta=C(V1)^a+(V2)$, where Ta are the grade thresholds, "a" is incremented from one to a value equal to a number of grades required, C is a constant, and V1 an V2 represent possible variation in said analogue form, said plurality of grades against which said digital representation is graded determining whether there is identification or not of the user.

10. The method according to claim 9, further comprising determining values of V1 and V2 by: determining minimum and maximum values which represent the extent of possible variation in said analogue form, said minimum and maximum values being determined from a number of sample analogue forms entered into the system by the user; and determining values of V1 and V2 which, when substituted into said equation, provide grades which classify said minimum and maximum values in one and the same grade.

11. The method according to claim 10, wherein said determining values of V1 and V2 repeatedly trials values of V1 and V2 to provide grades which classify said minimum and maximum values in one and the same grade, each said trial being followed by a calculated adjustment to the value of V1 or V2.

12. The method according to claim 11, wherein said repeated trials are also to provide grades wherein a range of said one and the same grade is greater than, but substantially equal to, a difference between said minimum and maximum values.

13. The method according to claim 12, wherein said deriving a digital representation comprises: digitizing said entered analogue form; and analyzing at least one aspect of the digitized entered analogue form, thereby to provide in respect of the at least one aspect an aspect measure indicative thereof, the aspect measure constituting said digital representation of the entered analogue form, said grading said digital representation grading at least one aspect measure against a said plurality of grades defined dependent upon possible variation in the aspect measure due to variation in that aspect of said analogue form.

14. The method according to claim 13, wherein said deriving a digital representation further comprises segmenting said digitized entered analogue form, said analyzing the at least one aspect of the digitized entered analogue form analyzing said at least one aspect in respect of each segment of the entered analogue form, said grading said digital representation grading the at least one aspect measure in respect of each said segment against a said plurality of grades defined dependent upon possible variation in the aspect measure in respect of that segment due to variation in that aspect in that segment of said analogue form.

15. The method according to claim 14, wherein said analogue form is a handwritten signature.

16. The method according to claim 15, wherein said at least one aspect of the digitized entered handwritten signature is selected from a group consisting of: peaks and troughs in each segment of the entered signature; density of each segment of the entered signature; area of each segment of the entered signature; and relative mean position of each segment of the entered signature.

* * * * *